March 24, 1936.  A. J. SMITH  2,035,200
SNAP FASTENER MEMBER AND INSTALLATION
Filed April 13, 1931
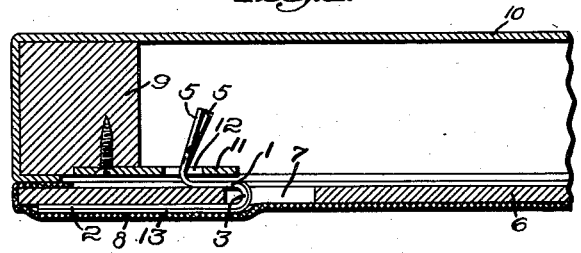
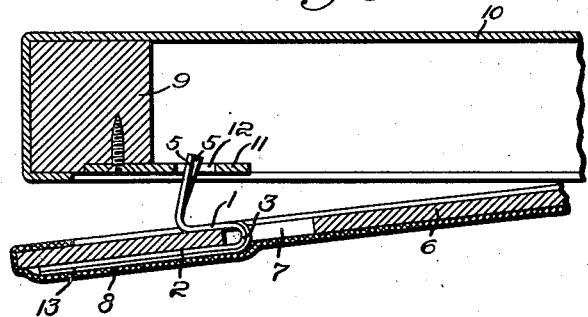
  
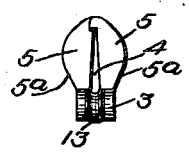
Inventor:
Alfred J. Smith
by Emery, Booth, Varney & Townsend
Attys Patented Mar. 24, 1936

2,035,200

UNITED STATES PATENT OFFICE 2,035,200

SNAP FASTENER MEMBER AND INSTALLATION

Alfred J. Smith, Detroit, Mich., assignor to United-Carr Fastener Corporation, Cambridge, Mass., a corporation of Massachusetts Application April 13, 1931, Serial No. 529,701

2 Claims. (Cl. 45—138)

My invention aims to provide improvements in snap fastener members and snap fastener secured installations.

In the drawing which illustrates a preferred embodiment of my invention:—

Figure 1 is a plan section taken through a portion of a motor vehicle door showing my invention;

Fig. 2 is a section similar to Figure 1, but showing a manner of applying the finishing part;

Fig. 3 is a top plan of the stud member which forms a part of my invention;

Fig. 4 is a bottom plan of the stud member; and

Fig. 5 is an end view of the stud member.

My invention, as illustrated by the drawing, is particularly, though not exclusively, adapted for use in connection with securing upholstery covered panels to the inside structure of a motor vehicle or other frame structure. For the purposes of illustration only I have shown a panel of upholstery as it would be applied to a door structure, especially if the door structure had a wooden frame to which could be applied plates or strips to provide socket means which would be located at substantial distances from the edges of the door or other structure. Therefore, my invention is particularly useful in connection with installations where the stud-receiving apertures are located inwardly from the edges of the structures at greater distances than has been the usual practice heretofore.

The fastener stud member, which I have preferred to illustrate, is formed from a single piece of sheet metal and has a U-shaped base and socket-engaging means extending from one side of said base. The base of the fastener comprises a short arm 1, a long arm 2 and a portion 3 connecting said arms and holding them in spaced relation. At the free end of the arm 1 the metal is bent upwardly and divided by a slit 4 to provide yieldable fingers 5—5 each of which has an edge 5ª which cooperates with the other to present a diverging and then converging means for engagement with socket means. The fingers 5—5 are presented in offset planes (Fig. 3) so that one may cross the other and both are bent toward the portion 3 so that the axis of the fastening means is inclined (Figs. 1 and 3) with relation to a plane which would be normal to the plane of the base. The slit 4 extends centrally of the arm 1 nearly to the portion 3 (Fig. 3) so that the fingers 5 may be permitted to move toward each other because of the fact that the material of the arm 1 may twist.

In my improved installation the finishing structure, to which the stud is attached, comprises a backing 6 of cardboard or similar material having a series of apertures 7 (one being shown) around it and spaced substantial distances inwardly from the periphery. The front side of the backing is covered with a suitable covering 8 of cloth, leather, or the like and is folded over the edge and secured to the back as shown in Figs. 1 and 2.

The fastener stud members are preferably applied after the covering 8 is applied to the backing 6 and from the rear side by inserting the long arm 2 through an aperture 7 and forcing the base into place so that the fastener assumes a position as shown in Fig. 2. The base is yieldable so that the arms may spread during the attaching operation.

The supporting frame structure illustrated includes a wooden frame means 9 covered at one side by sheet metal 10 which is bent over the edge of the wooden frame, as shown in Figs. 1 and 2. It is inconvenient and expensive to carry the metal 10 beyond the inner edge of the wood 9 so I have secured thereto a number of small plates 11 or strips in which I provide stud-receiving apertures 12 to receive the fingers 5—5 of the studs, as shown in Figs. 1 and 2.

Heretofore, fastener studs have been used which had U-shaped bases and yieldable stud means extending therefrom normal to the plane of the base. These are satisfactory in some installations but in installations of the type illustrated, wherein the apertures 12 are located farther from the edge of the door or the like than usual, the usual construction is not as satisfactory as my improved fastener. The long arm 2 of the base is essential to urge the edge of the finishing structure tightly against the frame structure and thereafter to hold it there. To do this, the arm 2 has been stiffened by the rib 13 which extends the entire length of that arm and also along the connecting portion 3 (Fig. 5) to the end of the slit 4. The studs may shift laterally to some extent since the apertures 7 are larger in cross-sectional area than the portion 3. Thus, the studs may be properly aligned with the apertures 12.

By inclining the fingers 5—5 they are easier to enter into an aperture 12 (Fig. 2), especially after one side of the finishing structure has been attached, because they are presented substantially in alignment with an aperture 12 when the base is angled relative to the plane of the frame structure.

My invention is adapted for use in connection with re-upholstering of vehicles which are not equipped for attachment of upholstery by means of snap fasteners. It is particularly useful in connection with re-upholstering of wooden framed structures.

While I have illustrated and described a preferred embodiment of my invention, I do not wish to be limited thereby, because the scope of my invention is best defined by the following claims.

I claim:

1. A snap fastener secured installation comprising, in combination, a structure presenting a stud-receiving aperture a substantial distance inwardly from the edge thereof, a relatively thin finishing part covering said structure and having a backing provided with an aperture located a substantial distance inwardly from the edge and a snap fastener stud member securing said finishing part to said structure in predetermined relation, said stud member having a U-shaped base comprising a pair of spaced arms engaging opposite sides of the backing and joined at one end by means passing through the aperture in said backing and yieldable socket-engaging means extending from one of said arms away from said backing and into said stud-receiving aperture at an angle to a plane normal to the plane of the base for the purposes described.

2. A snap fastener secured installation comprising, in combination, a structure presenting a stud-receiving aperture a substantial distance inwardly from the edge thereof, a relatively thin finishing part covering said structure and having a backing provided with an aperture located a substantial distance inwardly from the edge and a snap fastener stud member securing said finishing part to said structure in predetermined relation, said stud member having a U-shaped base comprising a pair of spaced arms engaging opposite sides of the backing and joined at one end by means passing through the aperture in said backing, socket-engaging means extending from one arm into the stud-receiving aperture and said socket means comprising a pair of yieldable fingers extending from said finishing part at an angle tipping away from the edge of the finishing part as and for the purposes described.

ALFRED J. SMITH.